(12) United States Patent
Raby et al.

(10) Patent No.: US 8,346,454 B2
(45) Date of Patent: Jan. 1, 2013

(54) METHOD OF MAINTAINING OPTIMAL BRAKING AND SKID PROTECTION FOR A TWO-WHEELED VEHICLE HAVING A SPEED SENSOR FAILURE ON A SINGLE WHEEL

(75) Inventors: Ronald Raby, Chatsworth, CA (US); Jordan Silberling, Redondo Beach, CA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

(21) Appl. No.: 13/227,234

(22) Filed: Sep. 7, 2011

(65) Prior Publication Data

US 2011/0320101 A1 Dec. 29, 2011

Related U.S. Application Data

(62) Division of application No. 12/174,385, filed on Jul. 16, 2008, now Pat. No. 8,083,295.

(51) Int. Cl.
*B60T 7/12* (2006.01)

(52) U.S. Cl. .......................................... 701/78; 303/155

(58) Field of Classification Search .................... 701/70, 701/74, 78, 72, 76; 303/116.1, 113.2, 116.2, 303/146, 191, 189, 113.5, 115.2, 155
See application file for complete search history.

(56) References Cited

U.S. PATENT DOCUMENTS

| 3,711,163 | A | 1/1973 | Booher |
|---|---|---|---|
| 3,768,873 | A | 10/1973 | Hirzel |
| 3,856,365 | A | 12/1974 | Steigerwald et al. |
| 3,880,475 | A | 4/1975 | Booher |
| 4,005,911 | A | 2/1977 | Klatt et al. |
| 4,007,970 | A | 2/1977 | Romero |
| 4,078,845 | A | 3/1978 | Amberg et al. |
| 4,120,540 | A | 10/1978 | Devlieg |
| 4,130,322 | A | 12/1978 | Cook |
| 4,231,442 | A | 11/1980 | Birkeholm |
| 4,269,455 | A | 5/1981 | Beck et al. |
| 4,404,633 | A | 9/1983 | Goicoechea |
| 4,412,291 | A | 10/1983 | Amberg et al. |

(Continued)

FOREIGN PATENT DOCUMENTS

DE 19511161 A1 10/1996

OTHER PUBLICATIONS

PCT/US2009/050852 International Search Report, dated Dec. 10, 2009.

*Primary Examiner* — Thomas Black
*Assistant Examiner* — Luke Huynh
(74) *Attorney, Agent, or Firm* — Fulwider Patton LLP

(57) ABSTRACT

The method of maintaining optimal braking and skid protection for a two-wheeled vehicle wheel with a wheel speed sensor failure involves providing pulsed braking pressure to the affected wheel with the wheel speed sensor failure. If an incipient or initial skid on another wheel with a functioning wheel speed sensor has occurred, the pulsed braking pressure to the affected wheel is limited to the brake pressure command that caused the last incipient or initial skid on the other wheel, scaled by a factor for safety. Otherwise the pulsed braking pressure to the affected wheel is limited to be no greater than the greatest commanded brake pressure to the other wheel. The pulsed braking pressure is also limited to be less than the brake pressure commanded to the affected wheel.

5 Claims, 1 Drawing Sheet

U.S. PATENT DOCUMENTS

| | | |
|---|---|---|
| 4,986,610 A | 1/1991 | Beck et al. |
| 5,019,774 A | 5/1991 | Rosenberg |
| 5,024,491 A | 6/1991 | Pease, Jr. et al. |
| 5,172,960 A | 12/1992 | Chareire |
| 5,397,173 A | 3/1995 | Bourguet |
| 5,417,477 A | 5/1995 | Lasbleis |
| 5,511,863 A | 4/1996 | Suh |
| 5,707,118 A | 1/1998 | Kolberg et al. |
| 5,845,975 A | 12/1998 | Wells |
| 5,918,951 A | 7/1999 | Rudd, III |
| 6,517,171 B2 | 2/2003 | Oshiro et al. |
| 2005/0040286 A1 | 2/2005 | Radford |
| 2009/0276133 A1 | 11/2009 | May et al. |
| 2010/0117447 A1 | 5/2010 | Cahill |

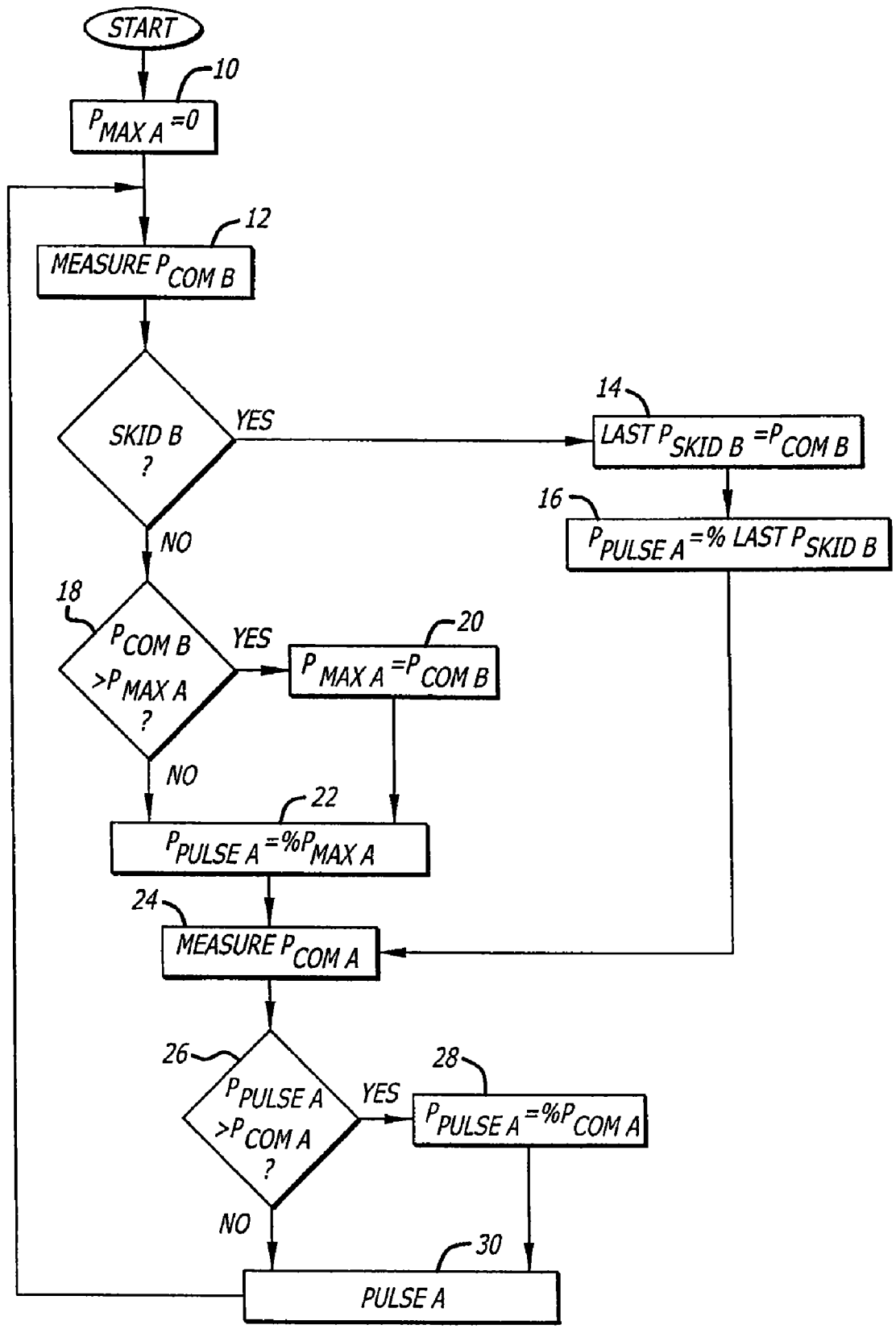

METHOD OF MAINTAINING OPTIMAL BRAKING AND SKID PROTECTION FOR A TWO-WHEELED VEHICLE HAVING A SPEED SENSOR FAILURE ON A SINGLE WHEEL

CROSS-REFERENCE TO RELATED APPLICATIONS

This application is a division of application Ser. No. 12/174,385, filed on Jul. 16, 2008, which is incorporated by reference in its entirety herein.

BACKGROUND OF THE INVENTION

This invention relates generally to aircraft braking systems, and more particularly concerns a method for maintaining optimal braking and skid protection for a two-wheeled vehicle wheel with a wheel speed sensor failure.

Automatic braking systems commonly have been provided on commercial, military, and large turbine aircraft to aid the deceleration of the aircraft upon landing. Modern aircraft braking systems typically optimize braking efficiency by adapting to runway conditions and other factors affecting braking to maximize deceleration, corresponding to the level of brake pressure selected by the pilot. Antiskid systems for military, small business jets and general aviation airplanes have traditionally utilized antiskid control systems that sense wheel speed from left and right wheel speed sensors.

Individual wheel antiskid control systems typically use separate control channels for each wheel and individual wheel antiskid valves. Peak efficiency is maintained on both wheels, so that the shortest stopping distance is achieved. However, in the event of a failed wheel speed sensor, there exists the possibility that brake pressure reduction on one wheel due to antiskid activity will cause a shift in airplane direction during a temporary brake pressure imbalance.

There were previously two options in the event of a failed wheel speed sensor. One option was to inhibit braking on that wheel. This is not practical on some aircraft, especially with only two braked wheels, because of the loss of directional control and the increase in stopping distance. The second option was to pulse the brake pressure on and off up to the brake pressure command from the pilot's brake pedals. This method prevents blown tires and allows directional control, but causes significant loads on the landing gear structure due to the occurrence of periodic skid events caused by brake pressure application. These loads can be high enough to cause excessive wear and possibly failure of the landing gear.

It would be desirable to provide pulsed brake pressure to a wheel with a speed sensor failure, to periodically release brake pressure on the wheel, allowing the wheel to spin up, in order to protect against tire failure due to lockup. Particularly for a two-wheeled vehicle with a wheel affected by a speed sensor failure, it would also be desirable to apply a fraction of the skid pressure from another wheel with a functioning wheel speed sensor to the affected wheel to prevent the brake pressure on the affected wheel from being large enough to skid, in most conditions. It would also not be desirable to inhibit braking on a wheel with a failed speed sensor, because maintaining braking on the affected wheel allows the pilot to maintain directional control using differential braking. For a two-wheeled vehicle with a wheel affected by a wheel speed sensor failure, it would also be desirable to limit the brake pressure on the affected wheel to a value below the skid brake pressure on the opposite wheel, in order to greatly improve stability margins on the landing gear. The present invention meets these and other needs.

SUMMARY OF THE INVENTION

Briefly, and in general terms, the present invention provides for a method for controlling antiskid braking of a vehicle such as an aircraft having a plurality of wheels with a wheel speed sensor for each wheel, when a wheel speed sensor of one of the wheels fails, by providing pulsed braking pressure to the affected wheel, and determining the braking pressure to be pulsed to the affected wheel, based upon whether an incipient or initial skid on another wheel not affected by a wheel speed sensor failure has been detected. The method of the invention allows safe braking to continue in an antiskid braking system that can otherwise result in asymmetric braking, or proportional braking without antiskid protection that could lead to tire failure, both of which are particularly significant for an aircraft having only two braked wheels. The method of the invention allows antiskid braking on a wheel with a failed sensor to be maintained, which improves stopping performance and safety margins.

The present invention accordingly provides for a method for controlling antiskid braking of an aircraft having two or more wheels in a group of wheels, such as a pair of wheels, for example, with a wheel speed sensor associated with each wheel for antiskid control of the group of wheels. In one aspect of the method of the invention, if a first wheel speed sensor of a first wheel has failed, and a second wheel speed sensor of a second wheel is functioning, if an incipient or initial skid of the second wheel associated with a commanded braking pressure of the second wheel has occurred, the commanded braking pressure of the second wheel is used as a brake pressure limit of the first wheel. A maximum brake pressure of the first wheel is then determined to be a first desired fraction of the brake pressure limit of the first wheel. A modulated brake pressure is then determined as a second desired fraction of the maximum brake pressure of the first wheel, and modulated pressure pulses of the modulated brake pressure are provided to the first wheel.

In another aspect of the method of the invention, if an incipient or initial skid of the second wheel has not occurred, the maximum brake pressure of the first wheel is determined to be the highest commanded braking pressure of the second wheel.

In another aspect of the method of the invention, a commanded braking pressure of the first wheel is monitored, and the modulated brake pressure to the first wheel is limited to be less than the commanded braking pressure of the first wheel. The modulated brake pressure to the first wheel may be limited to be a third desired fraction of the commanded braking pressure of the first wheel. In a presently preferred aspect, the modulated pressure pulses are modulated to have a constant period and duty cycle between a return pressure and the modulated pulsed pressure.

These and other aspects and advantages of the invention will become apparent from the following detailed description, and the accompanying drawing which illustrates, by way of example, the features of the invention.

BRIEF DESCRIPTION OF THE DRAWINGS

The FIGURE is a schematic flow diagram illustrating the steps of the method of the invention.

DETAILED DESCRIPTION OF THE PREFERRED EMBODIMENTS

Referring to the drawing, which is provided by way of example, and not by way of limitation, the present invention provides for an antiskid system and method for maintaining optimal braking and skid protection for a vehicle, such as a two-wheeled vehicle, such as an aircraft, for example, containing redundant hydraulic systems with split, cavity brake pistons. The method of the invention becomes operative in the event of a loss of wheel speed sensing on a wheel, if there is a functioning wheel speed sensor on another wheel. In response to a brake pressure command for the affected wheel with the failed sensor, braking pressure to the affected wheel is modulated with a constant period and duty cycle between return pressure and a calculated maximum pulsed pressure, to allow the brake control system to maintain optimal braking on the affected wheel. The pulsed brake pressure is limited to the brake command that caused the last incipient or initial skid on the other wheel, scaled by a factor for safety. Every time the brake control system detects the start of an incipient or initial skid on the wheel with the functioning speed sensor, that brake pressure scaled by a factor is set as the maximum brake pressure on the pulsed wheel.

If an incipient or initial skid has not been detected on the wheel with the functioning wheel speed sensor during the current landing, the pulsed pressure on the wheel with the failed speed sensor is limited to be no greater than the greatest brake pressure that has been commanded on the wheel with the functioning wheel speed sensor. This prevents the affected wheel from skidding, and enables the pilot to achieve directional control with differential braking.

In another aspect, the maximum pulsed pressure for the wheel with the failed wheel sensor may also be limited to be less than the brake pressure command from the pilot's input at the brake pedals, allowing directional control to be maintained during a landing. The pressure can be applied and reduced instantly, or ramped to prevent causing a skid due to pressure overshoots.

Referring to the FIGURE, for two or more wheels of a group of wheels in which each wheel has its own wheel speed sensor, such as a pair of wheels A and B, for example, once it is determined that there is a complete loss of wheel speed sensing on one of the wheels, such as wheel A, for example, and if there is a functioning wheel speed sensor on another wheel of the group, such as wheel B, the method of the invention illustrated in the FIGURE is activated. The maximum brake pressure on the wheel A to be pulsed, $P_{MAX\ A}$, is typically initialized 10 to a value such as zero, for example. The commanded braking pressure $P_{COM\ B}$ of the other wheel B is measured at 12, and if an incipient or initial skid on wheel B has been detected, based upon wheel speed signals from the associated wheel speed sensor, the commanded brake pressure $P_{COM\ B}$ that caused the last incipient or initial skid on the wheel B is stored at 14 as the LAST $P_{SKID\ B}$, and this value is used as a limit of the brake pressure on the wheel A to be pulsed. Every time the brake control system detects the start of an incipient or initial skid on the wheel B with the functioning speed sensor, that brake pressure, LAST $P_{SKID\ B}$, scaled by a percentage factor, such as 90-99%, for example, is set as the maximum brake pressure $P_{PULSE\ A}$ on the pulsed wheel at 16.

If wheel B with the functioning speed sensor has not yet experienced any initial or incipient skidding during the current wheel braking, such as during a landing, for example, the commanded brake pressure $P_{COM\ B}$ is compared at 18 with the maximum brake pressure on the wheel A to be pulsed, $P_{MAX\ A}$, and the highest commanded brake pressure $P_{COM\ B}$ is stored as the maximum brake pressure on the wheel A to be pulsed, $P_{MAX\ A}$, at 20. The pulsed pressure $P_{PULSE\ A}$ on the wheel A with the failed speed sensor will be limited at 22 to be to a percentage value, such as 95-100%, for example, of the maximum brake pressure on the wheel A to be pulsed, $P_{MAX\ A}$, so as to be no greater than the greatest commanded brake pressure $P_{COM\ B}$ on the healthy wheel, for the duration of the landing. This prevents the pulsed wheel from skidding and maintains the ability of the pilot to achieve directional control with differential braking.

The brake pressure command from the pilot's input at the brake pedals $P_{COM\ A}$ is also measured at 24, and the maximum pulsed pressure $P_{PULSE\ A}$ on the wheel A for the failed channel is compared at 26 with the commanded brake pressure $P_{COM\ A}$, and limited at 28 to be less than the commanded brake pressure $P_{COM\ A}$, such as 95-100%, for example, of the commanded brake pressure $P_{COM\ A}$. The brake pressure command for the wheel with the failed sensor will provide a modulated pressure pulse, PULSE A, at 30, with a constant period and duty cycle between return pressure and a calculated maximum pulsed pressure, $P_{PULSE\ A}$, on the wheel A with the failed wheel speed sensor.

It should be apparent from the foregoing that the presently described system and method is applicable to various types of vehicles. Aircraft, automobiles, trucks and trains all have the need for some type of anti-skid braking control. The present invention can readily be used on any such vehicles.

It will also be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A method for controlling antiskid braking of first and second paired wheels of an aircraft, said first and second paired wheels having corresponding first and second wheel speed sensors associated therewith, respectively, said first and second wheel speed sensors configured to generate wheel speed signals of said corresponding first and second paired wheels, respectively, for antiskid control of said first and second paired wheels, based upon said wheel speed signals, the method comprising the steps of:
   determining that the first wheel speed sensor is not functioning to generate wheel speed signals;
   determining that the second wheel speed sensor is functioning to generate wheel speed signals;
   monitoring a commanded braking pressure of said second wheel;
   determining a highest commanded braking pressure of said second wheel;
   determining whether an incipient or initial skid of said second wheel associated with said commanded braking pressure of said second wheel has occurred, based upon said wheel speed signals from said second wheel speed sensor;
   storing said highest commanded braking pressure of said second wheel as said maximum brake pressure of said first wheel if an incipient or initial skid of said second wheel associated with said commanded braking pressure of said second wheel has not occurred;
   determining a modulated brake pressure as a first predetermined fraction of said maximum brake pressure of said first wheel; and
   providing modulated pressure pulses of the modulated brake pressure to said first wheel.

2. The method of claim 1, further comprising the steps of:
storing said commanded braking pressure of said second wheel as a brake pressure limit of said first wheel if said skid of said second wheel associated with said commanded braking pressure has occurred; and
determining the maximum brake pressure of said first wheel as a second predetermined fraction of said brake pressure limit of said first wheel.

3. The method of claim 1, further comprising the steps of:
monitoring a commanded braking pressure of said first wheel;
comparing said modulated brake pressure to said first wheel with said commanded brake pressure of said first wheel; and
limiting said modulated brake pressure to be less than said commanded braking pressure of said first wheel.

4. The method of claim 3, wherein said step of limiting said modulated brake pressure comprises limiting said modulated brake pressure as a third predetermined fraction of said commanded braking pressure of said first wheel.

5. The method of claim 1, wherein said step of providing modulated pressure pulses comprises modulating said modulated pressure pulses with a constant period and duty cycle between a return pressure and said modulated pulsed pressure.

* * * * *